UNITED STATES PATENT OFFICE.

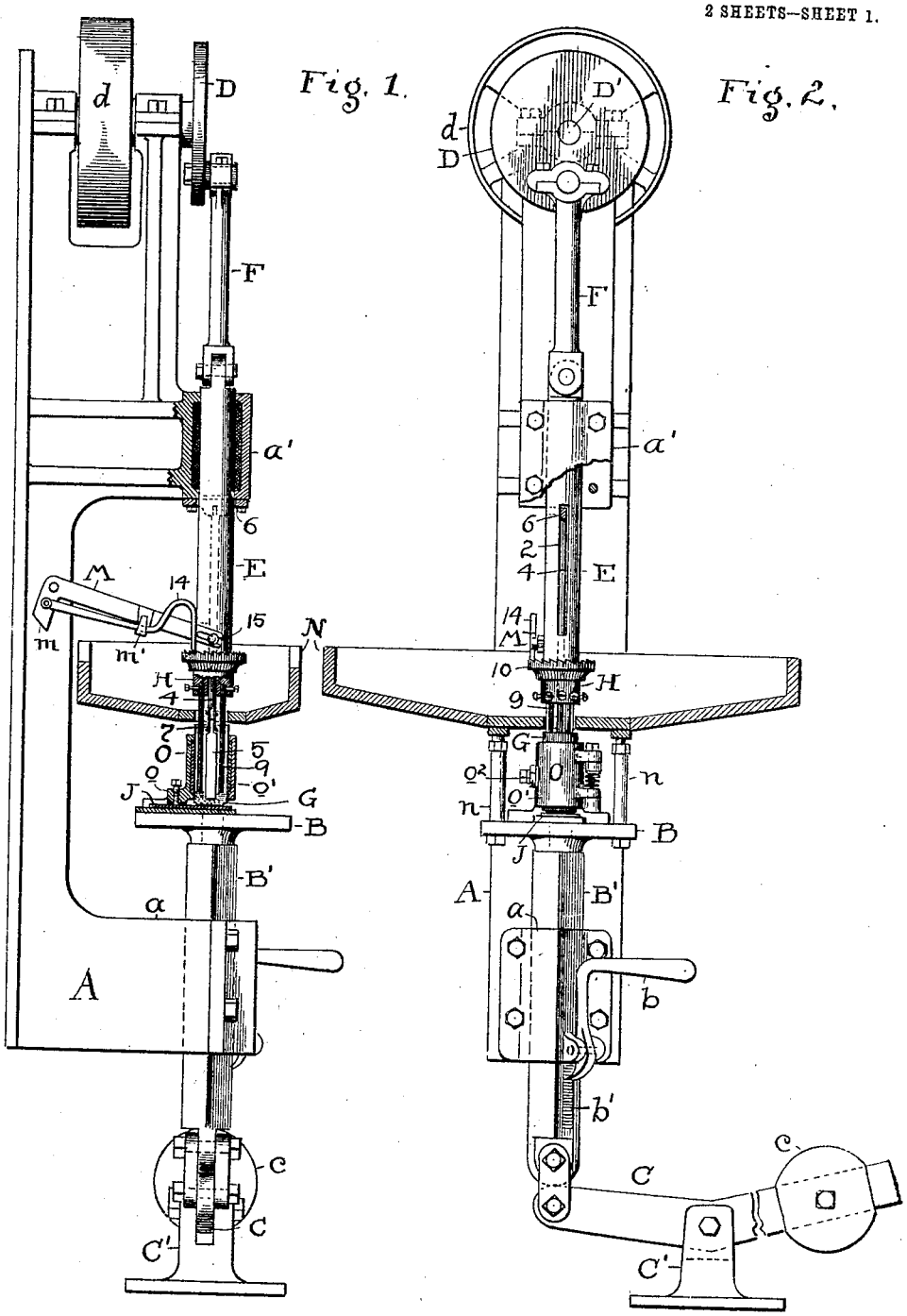

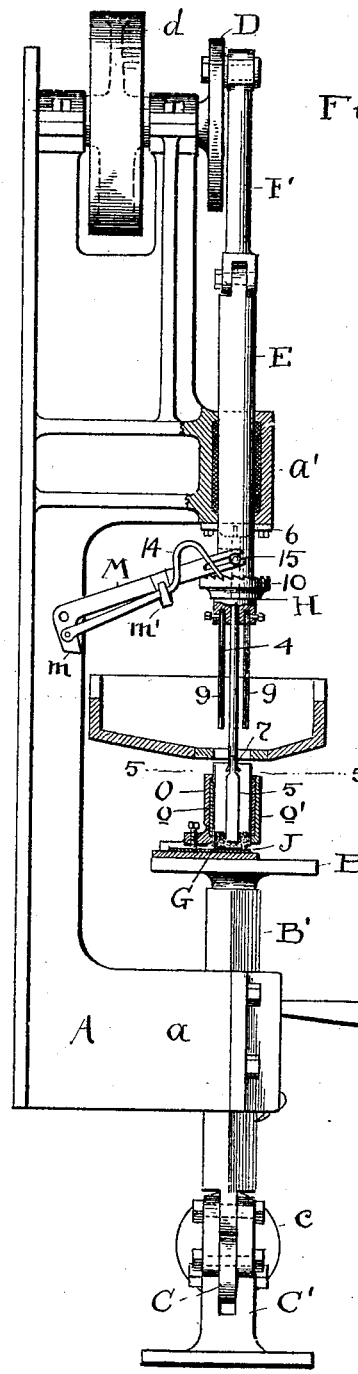

PHILIP P. NUNGESSER, OF CLEVELAND, OHIO, ASSIGNOR TO THE NUNGESSER ELECTRIC BATTERY CO., OF CLEVELAND, OHIO, A CORPORATION OF OHIO.

MACHINE FOR FILLING DRY BATTERIES.

No. 809,526.          Specification of Letters Patent.          Patented Jan. 9, 1906.

Application filed August 5, 1905. Serial No. 272,802.

*To all whom it may concern:*

Be it known that I, PHILIP P. NUNGESSER, a citizen of the United States, residing at Cleveland, in the county of Cuyahoga and State of Ohio, have invented certain new and useful Improvements in Machines for Filling Dry Batteries; and I do declare that the following is a full, clear, and exact description of the invention, which will enable others skilled in the art to which it appertains to make and use the same.

My invention relates to a machine for filling dry batteries; and the invention consists in the construction and combination of parts substantially as shown and described, and particularly pointed out in the claims.

In the accompanying drawings, Figure 1 is a side elevation of the machine, partly in section vertically; and Fig. 2 is a front elevation thereof, partly in section and corresponding in the relation of parts to Fig. 1. Fig. 3 is a side elevation of the machine, partly in section and resembling Fig. 1 in these particulars, but with certain parts in raised position as compared with Fig. 1. Fig. 4 is an enlarged vertical elevation of certain of the operating parts, as hereinafter fully described; and Fig. 5 is a plan view looking down from line 5 5, Fig. 3.

As thus shown, the invention, comprises an upright main frame A of suitable elevation and constructed here and there to support certain of the working parts, as will hereinafter fully appear. The said working parts are simple in construction and direct and positive in their operation, and comprise a stand-top B, supported upon a standard B', which is adapted to work up and down in an arm $a$, projecting forward from main frame A and having a vertical or straight bearing to sustain and guide said standard in its operations. A counterweight-lever C is linked to said standard at its lower end and pivoted between its ends on a suitable support C', and an adjustable counterweight $c$ is supported on its outer free end and is of a size or weight to overbalance the parts resting on the inner end of said lever, thus raising said parts and holding them up when they are otherwise free or released. In operation, as will hereinafter be seen, the said standard and the stand-top thereon are gradually depressed as a battery-cup is filled from above and packed, and the depression of said stand is taken up and held progressively by a gravity-pawl $b$, engaging ratchet-teeth $b'$ on said standard. Then when the cup has been filled the operator grips handle of pawl $b$ and releases the pawl, which permits the counterweight $c$ to drop and restore the parts to working position. Usually a noiseless drop-rest is provided for said weight, as otherwise it would probably make considerable noise in dropping. The power-actuated mechanism for the parts above the said stand-and-cup mechanism comprises a rotating crank D, a vertical shaft E, and a link or rod F, connecting said crank and shaft. Broadly, these three parts as thus supported and arranged are not in themselves new, but are an adaptation from an old and well-known form of mortising-machine, or what is familiarly known as a "sticker." This invention consists in the other mechanisms designed for this especial use and in their combination with the said several actuating parts and through which the ultimate operative effects of said parts is modified and differentiated, as also will now be seen. In the present relation and use the crank D is supported on a power-driven shaft D', carrying a band wheel or pulley $d$ or equivalent means to communicate power to said shaft. An eccentric or other alternative means may be substituted for the special construction of crank shown. The said vertical shaft E is supported in a longitudinal bearing $a'$ on the front of main frame A perpendicularly over the cup-supporting stand B and axially over supporting-standard B' for said stand. Structurally the said shaft is provided with an open slot 2, centrally lengthwise between its ends, and an axial bore 3 below said slot, and the rod 4 for gripping and locating the carbon member 5 is projected through this bore and permanently secured at its upper end to a cross-piece 6, which passes through said slot 2 and is fixed at its end to the bottom of shaft-bearing $a'$. This leaves shaft E free to reciprocate vertically in its bearing $a'$, while rod 4 remains stationary therein. Gripping-fingers 7 for engaging and holding carbon 5 are fixed on the lower end of said rod 4, and the carbons are placed in said fingers by hand when the stand B has been lowered in filling and tamping a cup. In this relation of the parts the filled cup is removed from the cup-holder O on said stand after the tamping-bars 9 have been raised out of the way and before standard B' and counterweight-arm C are released through ratchet b. Indeed, a filled cup is removed and a new one put in place and a carbon is placed in the cup for the next operation before table B is permitted to rise to proceed with the filling and tamping of another cup. A further preliminary also is to partially or slightly fill the empty cup after it has been placed in the holder with material from hopper N. Said hopper has a central opening over the cup, and the material is fed through said opening into the cup at the same time that tamping-bars 9 are in operation. These bars are fixed on head H, which is horizontally rotatable on the lower end of shaft E, and said head consists of two parts 10 and 12, respectively, which are rotarily supported from a cap-nut 13, engaged upon the lower threaded extremity of shaft E, with room enough over its top to rotarily support the inner edge of ratchet-ring 10 thereon. The lower cup-shaped part 12 on head H is threaded within ratchet-ring 10 and loosely surrounds nut 13. The tamping bars or rods 9 are removably socketed in the part 12. Having said head thus constructed and supported, the ratchet-teeth on the top surface of ring 10 are engaged by gooseneck-pawl 14, controlled by arm M, pivoted at one end on main frame A relatively above head H, about as shown, and having an open slot 15 at its other end working on a pin or lug on the side of shaft E above said ratchet 10 a slight distance. The said arm is provided with a downward projection $m$ below its pivot, to which pawl 14 is pivoted, and has a keeper $m'$, in which the pawl has room to play vertically, and so it follows when the arm M is raised by the action of shaft E it gives a first forward impulse or start to the pawl, and the head H is accordingly rotated the desired distance. This continues to occur as the shaft E reciprocates with the effect for which this mechanism is designed of changing the positions of the tamping-bars rotarily in the battery-cup. Obviously the operator continues to fill the cup as it is being tamped until the cup is full, when it is removed, as above described.

The stand B carries a cup-holder O, which has a section $o$ fixed to the said stand and a section $o'$ hinged to section $o$ and adapted to be thrown open when caps are being placed or replaced and to be latched close when tamping is in progress. The section $o'$ should be provided with a spring-hinge to throw it open quickly, and any suitable convenient latch $o^2$ may be used.

By fixing the hopper N rigidly and evenly on stand B by means of posts $n$ I hold the operative relations of said parts uniformly together and maintain a fixed relation of the center of said hopper to the cup to be filled at all stages of the operation.

The battery-cup G is seated on a removable plate J, held within cup-holder O, and this is a desirable feature in view of the fact that the chemicals used in making up the battery destroy the seat for the cup.

It will be observed that the hopper N is adjustably supported upon standards or uprights $n$ from the table B, which carries the cup-holder fixed thereon. This enables me to adjust the elevation of the hopper with respect to the cup, which is placed within the holder to the end that the said hopper shall be lifted and held above the top of the cup a sufficient distance to enable the insulating pulp lining of the cup (not shown) to extend above the cup, say half an inch or more, and be flared outwardly about its top, so as to prevent the material with which the cup is filled from getting outside between the cup and the lining. If the material should get outside in this way, it would very soon eat a hole in the cup and render it worthless. Hence the importance of having the hopper raised away from the cup, so as to afford room for the upper edge of the lining, as just indicated.

What I claim is—

1. In a machine for filling dry batteries, a main frame, a vertically-reciprocating shaft having a fixed bearing in said frame, a ratchet-head rotatably suspended upon the lower end of said shaft, and tamping-bars fixed in the lower portion of said head.

2. In a machine for filling dry batteries, a vertically-reciprocating shaft and actuating means connected with the upper end thereof, a ratchet-head rotatably secured on the lower end of said shaft, a pawl to engage said ratchet and a pivoted arm carrying said pawl and having a slotted end engaged on said shaft, and tamping-bars fixed in said rotatable head, whereby when said shaft is raised said head and tamping-bars are raised with it.

3. In a machine for filling dry batteries, a vertically-reciprocating shaft and a separable ratchet-head rotatably secured on the lower end thereof, said head comprising an upper ratchet-ring and an inverted cup threaded into said ring, tamping-bars secured in said head, a pawl to rotate said head, and an arm carrying said pawl on the main frame and having a slotted engagement with said vertically-reciprocating shaft.

4. In a machine for filling dry batteries, a main frame, a vertically-reciprocating shaft having a straight-line bearing in said frame, said shaft provided with a longitudinal slot between its ends and an axial bore in its lower end opening into said slot, a rod for controlling the carbon element through said bore and slot, and a cross-piece fixing said rod to the main frame and traversing the slot in the said shaft.

5. In a machine for filling dry batteries, a main frame, a vertically-reciprocating shaft having a fixed vertical bearing in the frame, operating mechanism therefor supported on said frame and linked to the upper end of said shaft, in combination with a ratchet-head on the lower end of said shaft beneath said bearing, tamping-bars secured to said head and a rod to carry a carbon element having a fixed support and extending axially through the lower portion of said shaft and through the head thereon.

6. In a machine for making dry batteries, a main frame and a vertically-reciprocating shaft, in combination with a stand and a cup-holder fixed thereon axially beneath said shaft, a rotatable head on said shaft provided with tamping-bars adapted to extend within said cup-holder, and a hopper for the depolarizing material adjustably supported upon said stand apart from said cup-holder, whereby the hopper is held aloof from the cup and the lining therein.

7. In a machine for filling dry batteries, a main frame and a vertically-reciprocating shaft having a bearing in the front thereof, crank-actuating mechanism linked to the top of said shaft and a rotatable head suspended on the bottom thereof, tamping-bars on said head and pawl-and-ratchet mechanism to rotate said head, and a carbon-supporting rod extending through the lower portion of said shaft and fixed axially in said shaft and independently thereof.

8. In a machine for filling dry batteries, a main frame, a vertically-slidable standard supported by said frame at its front, a counterweighted lever engaging the lower end of said standard, a stand fixed on the top of said standard and a cup-holder fixed on said table having a hinged side, in combination with a vertically-reciprocating shaft, a head rotatable horizontally on said head and tamping-bars fixed to said head, means to rotate said head and a carbon-supporting rod extending axially through said shaft and head and supported independently thereof.

In testimony whereof I sign this specification in the presence of two witnesses.

PHILIP P. NUNGESSER.

Witnesses:
R. B. MOSER,
C. A. SELL.